(12) United States Patent
Bisdikian et al.

(10) Patent No.: US 8,489,525 B2
(45) Date of Patent: Jul. 16, 2013

(54) AUTOMATIC MODEL EVOLUTION

(75) Inventors: Chatschik Bisdikian, Chappaqua, NY (US); Joel W. Branch, Hamden, CT (US); Ting He, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/783,782

(22) Filed: May 20, 2010

(65) Prior Publication Data

US 2011/0289029 A1   Nov. 24, 2011

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
USPC .......................................................... 706/13
See application file for complete search history.

(56) References Cited

U.S. PATENT DOCUMENTS

| | | | |
|---|---|---|---|
| 5,974,406 A * | 10/1999 | Bisdikian et al. ........................ 1/1 |
| 6,205,413 B1 * | 3/2001 | Bisdikian et al. ............... 703/24 |
| 6,336,122 B1 | 1/2002 | Lee et al. |
| 6,499,036 B1 | 12/2002 | Gurevich |
| 6,845,341 B2 | 1/2005 | Beverly et al. |
| 7,260,501 B2 | 8/2007 | Pattipatti et al. |
| 7,779,415 B2 * | 8/2010 | Bisdikian et al. ............. 718/105 |
| 7,840,391 B2 * | 11/2010 | Dhanekula et al. ................ 703/2 |
| 7,873,535 B2 * | 1/2011 | Umblijs et al. .............. 705/7.12 |
| 7,882,045 B1 * | 2/2011 | Cole et al. ........................ 706/12 |
| 2003/0154044 A1 | 8/2003 | Lundstedt et al. |
| 2003/0200134 A1 | 10/2003 | Leonard et al. |
| 2003/0212520 A1 | 11/2003 | Campos et al. |
| 2004/0243568 A1 | 12/2004 | Wang et al. |
| 2005/0015624 A1 | 1/2005 | Ginter et al. |
| 2005/0060619 A1 | 3/2005 | Liberty et al. |
| 2005/0086335 A1 | 4/2005 | Liu et al. |
| 2005/0234763 A1 | 10/2005 | Pinto et al. |
| 2006/0025984 A1 | 2/2006 | Papaefstathiou et al. |
| 2006/0048101 A1 | 3/2006 | Krassovsky et al. |
| 2006/0085681 A1 | 4/2006 | Feldstein et al. |
| 2006/0112175 A1 | 5/2006 | Sellers et al. |
| 2006/0184527 A1 | 8/2006 | Chi et al. |
| 2007/0006154 A1 | 1/2007 | Yang et al. |
| 2007/0011300 A1 | 1/2007 | Hollebeek et al. |

(Continued)

FOREIGN PATENT DOCUMENTS

| | | |
|---|---|---|
| EP | 0371608 A2 | 6/1990 |
| EP | 0909059 A1 | 4/1999 |

(Continued)

OTHER PUBLICATIONS

Aalst et al., "Workflow Mining: Discovering Process Models from Event Logs", IEEE Computer Society, 2004, pp. 1-15.
Agrawal et al., "Mining Process Models from Workflow Logs", Advances in Database Technology—EDBT'98, Lecture Notes in Computer Science, 1998, vol. 1377, pp. 1-15.
Bondarev et al., "CARAT: a Toolkit for Design and Performance Analysis of Component-Based Embedded Systems", EDAA, 2007, pp. 1-6.

(Continued)

*Primary Examiner* — Michael B Holmes
(74) *Attorney, Agent, or Firm* — Cantor Colburn LLP; Preston Young

(57) ABSTRACT

A system includes a storage medium. The storage medium includes a model generation module that generates a candidate model based on a discrepancy and a model template. The storage medium also includes a model evaluation module that selectively updates a system model based on the candidate model.

10 Claims, 4 Drawing Sheets

U.S. PATENT DOCUMENTS

| | | |
|---|---|---|
| 2007/0112723 A1 | 5/2007 | Alvarez et al. |
| 2007/0124324 A1 | 5/2007 | Adi et al. |
| 2007/0220034 A1 | 9/2007 | Iyer et al. |
| 2008/0140601 A1 | 6/2008 | Mital et al. |
| 2008/0177689 A1 | 7/2008 | Jeng et al. |
| 2008/0183530 A1 | 7/2008 | Bagchi et al. |
| 2008/0183655 A1 | 7/2008 | Barsness et al. |
| 2010/0030521 A1 | 2/2010 | Akhrarov et al. |

FOREIGN PATENT DOCUMENTS

| | | |
|---|---|---|
| JP | 10133916 A | 5/1998 |
| JP | 2001014188 A | 1/2001 |
| JP | 2005267434 A | 9/2005 |
| WO | 2006075335 A2 | 7/2006 |

OTHER PUBLICATIONS

Iverson, David L., "Inductive System Health Monitoring" Proceedings of The 2004 International Conference on Artificial Intelligence (IC-AI '04), CSREA Press, Las Vegas, Nev., Jun. 2004, pp. 1-7.

Lee et al., "Method of Inference and Learning for Performance Modeling of Parallel Applications", ACM 2007, PPoPP'07, Mar. 14-17, 2007, pp. 1-10.

Restivo, Andre "Intelligent Log Analyzer", Jan. 9, 2003, Accessed via http://paginas.fe.up.pt/~eol/IA/MIA0203/trabalhos/analyzer.pdf, pp. 1-23.

Rubin et al., "Process Mining Framework for Software Processes", BPMCenter Report BPM-07-01, BPMcenter.org, 2006, pp. 1-13.

\* cited by examiner

AUTOMATIC MODEL EVOLUTION

BACKGROUND

The present invention relates to modeling of software systems, and more specifically, to automatic model evolution.

Transactions processed by distributed software applications can be difficult to monitor. Monitoring typically utilizes a precise model of the software system indicating how a transaction propagates through various states. When the software system changes, or is outdated, incomplete, or error-prone the models need to be updated. Manual updating of system models can be time-consuming.

SUMMARY

According to one embodiment of the present invention, a system includes a storage medium that includes a model generation module that generates a candidate model based on a discrepancy and a model template, and a model evaluation module that selectively updates a system model based on the candidate model.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
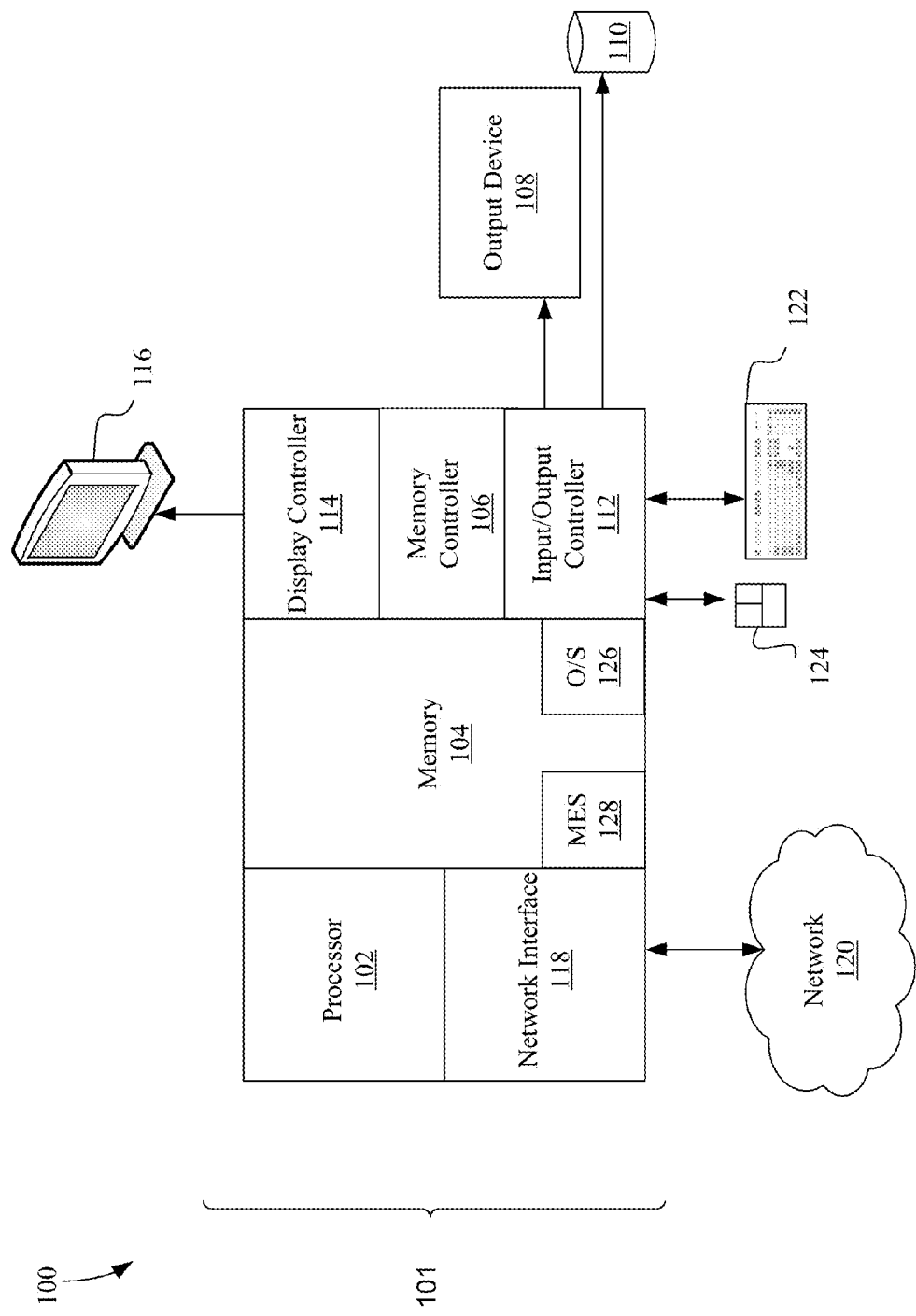
FIG. 1 is an illustration of a computing system that includes a model evolution system in accordance with an exemplary embodiment.

Turning now to the drawings in greater detail, it will be seen that in FIG. 1 an exemplary computing system includes a model evolution system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device that includes a memory and processor. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be performed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the performance of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a model evolution system (MES) 128 of the present disclosure. In various embodiments, the model evolution system 128 of the present disclosure is stored in the memory 104 (as shown), is run from a portable storage device (e.g., CD-ROM, Diskette, FlashDrive, etc.) (not shown), and/or is run from a remote location, such as from a central server (not shown).

Generally speaking, the model evolution system 128 manages the evolution of system models by automatically identifying changes and updating the model based on the changes. For example, the model evolution system 128 monitors computer transactions to determine discrepancies in log output. When discrepancies are found, the model evolution system 128 uses one or more templates to create candidate replacement models. If the candidate replacement models meet specified goodness of fit criteria, then the existing model can be updated with the changes from the candidate replacement model.

Figure 2:
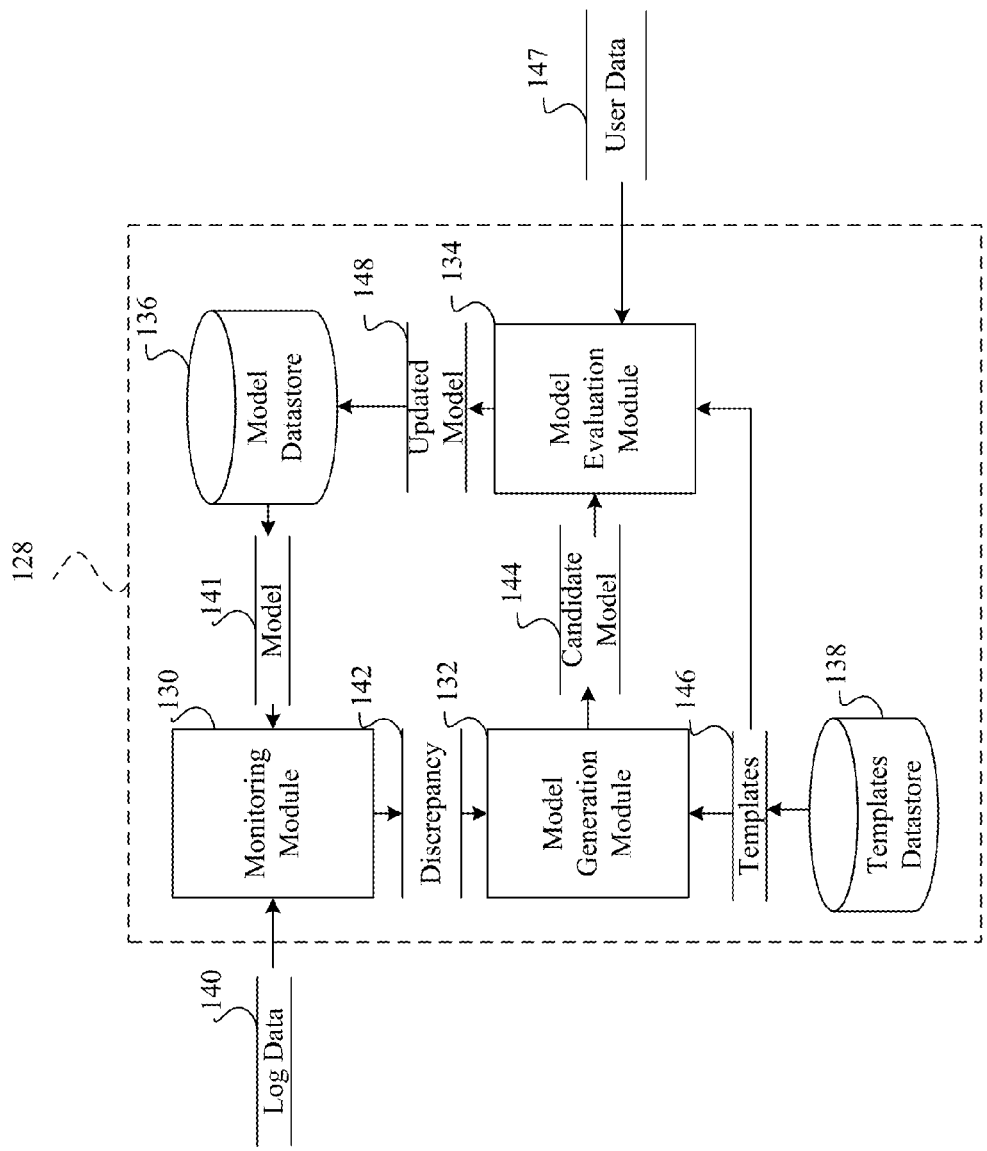
FIG. 2 is a dataflow diagram illustrating a model evolution system in accordance with an exemplary embodiment.

Turning now to FIG. 2, the model evolution system 128 is shown in more detail in accordance with an exemplary embodiment. The model evolution system 128 includes one or more sub-modules and datastores. As can be appreciated, the sub-modules can be implemented as software, hardware, firmware, a combination thereof, and/or other suitable components that provide the described functionality. As can further be appreciated, the sub-modules shown in FIG. 2 can be combined and/or further partitioned to similarly update evaluation models automatically. In various embodiments, the model evolution system 128 includes a monitoring module 130, a model generation module 132, a model evaluation module 134, a model datastore 136, and a templates datastore 138.

The monitoring module 130 receives as input log data 140. The log data 140 can be generated when one or more operations of a software system are performed. The software system can include one or more software applications that when performed carry out a transaction. For example, the transaction can be a computerized purchase, trade, etc. Based on the log data 140, the monitoring module 130 determines any discrepancies between the log data 140 and a model 141 of the software system. The discrepancies may be due to new perspectives of a user of the model and/or newly-emerging behaviors of system transactions. The monitoring module 130 generates discrepancy data 142 based on the discrepancies. The discrepancy data 142 can identify a particular feature of the model that is different and details on how that feature is different. The model 141 can include features such as states and transitions and can be predefined and stored in a model datastore 136.

The model generation module 132 receives as input the discrepancy data 142. Based on the discrepancy data 142, the model generation module 132 generates a candidate model 144 of the system using a set of meta-models, or templates 146. The process of generating the candidate model 144 may include adding or removing states and/or transitions and/or changing the definitions of the states.

Figure 3:
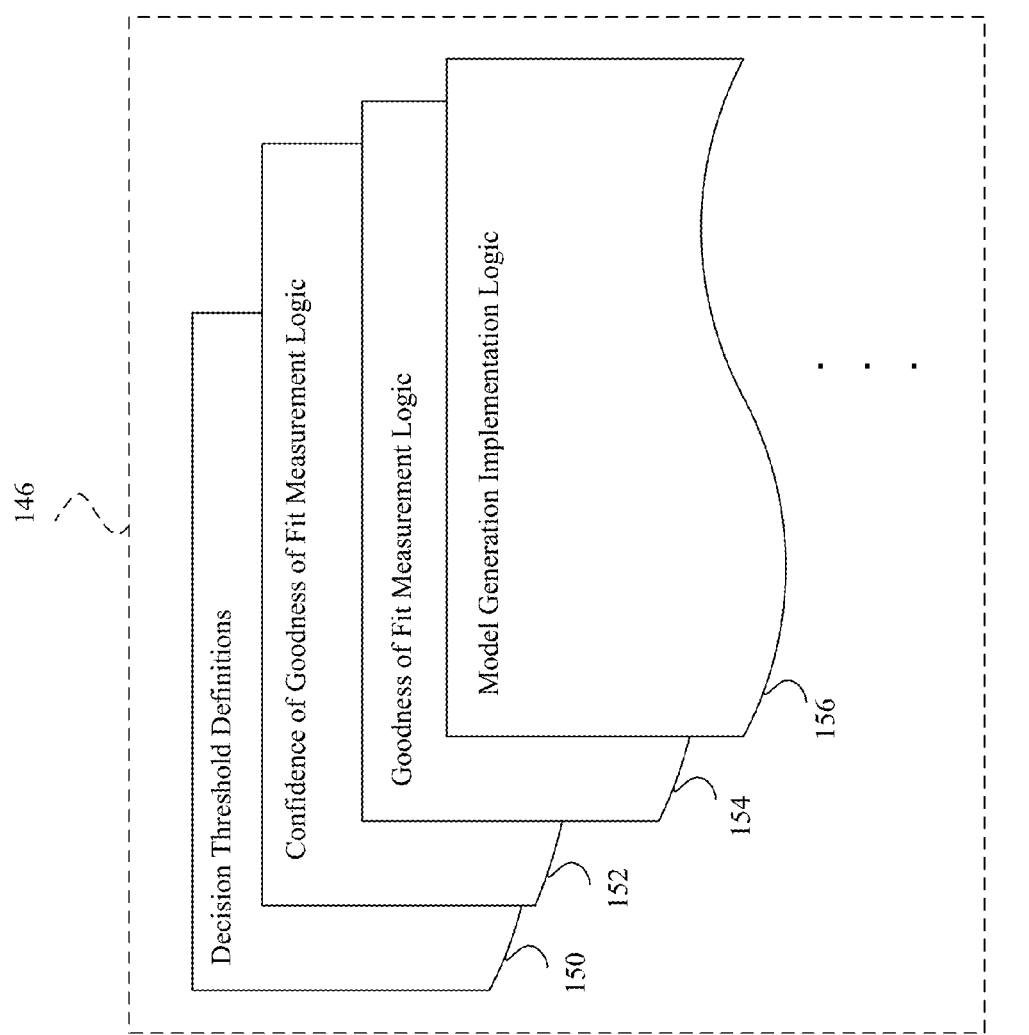
FIG. 3 is an illustration of templates of the model evolution system in accordance with an exemplary embodiment.

A template 146 includes, for example, a set of rules for updating a model given the differences as well as a computerized agent for executing the rules. Additionally, the template 146 may make decisions based on past history, as will be discussed in more detail below. For example, as shown in FIG. 3, the template 146 can include model generation implementation logic 156, goodness of fit measurement logic 154, confidence of goodness of fit measurement logic 152, and decision threshold definitions 150.

In various embodiments, the model generation implementation logic 156 may comprise rules to create a new state for the model, such as grouping log data based on the number of words they contain, tokenizing log data, and clustering log data using a Hamming-like distance between log data. For example, the tokenization of log data may split a log entry into words separated by empty space. In another example, the Hamming distance of two strings with the same number of tokens (i.e., words) may be a string of the same length marking the matching and mismatching token. For example, the log entries "Server 192.168.0.1 initializes port 5" and "Server 192.168.0.2 initializes port 7" may be mapped to the same model state "Server * initializes port *" when the Hamming distance of at least two is allowed for log data comprising of five tokens. Alternatively, each of the log entries may be in different clusters if the maximum Hamming distance allowed per cluster is either zero or one.

In various embodiments, the model generation implementation logic 156 may specify that each state be eventually represented using a regular expression syntax (such is the case with the string "String * initializes port *"). Log data entries (i.e., log records) will be compared against the regular expression representations of states and, when matched, the log record can be mapped to the state corresponding to the matched regular expression.

In various embodiments, the model generation implementation logic 156 may also comprise rules for ignoring newly created states, if for example, a newly created state can be found in the datastore of model states to be excluded from the evolution of the model (black-listed model states).

In various embodiments, the goodness of fit measurement logic 154 may include a process for collecting figures of merit associated with a candidate model that could result from a newly generated state, a newly generate transition between states, an updated parameter describing those, such as the likelihood of a particular state transition. Examples of such figures of merit may include, but are not limited to, a fraction of correctly matched log records, and an average likelihood of log record transitions or a fraction of correctly predicted log record transitions under the modeled state transition probabilities. Other figures of merit may include, but are not limited to, a count of the state appearances, an average variance of time between successive appearances of the state, a number of times two states follow each other, an average and variance of time between successive occurrences of transitions between the same two states, etc.

In various embodiments, the confidence of goodness of fit measurement logic 152 may comprise rules that describe acceptable error bounds on the measured figures of merit for the goodness of fit, or a minimum required number of new log records required for each state and/or pairs of log records for newly observed state transitions and so on. The combination of these two pieces of logic results in producing new candidate model elements (e.g., the state models, state transition, and state transition parameters, such as the frequency of specific transition), and/or model elements that satisfy prescribed confidence (or, quality) levels so that reliable model decision updates can be made.

In various embodiments, the decision threshold definitions 150 may provide a set of thresholds for each goodness of fit metric. For example, it may provide a lower bound and an upper bound. If the goodness of fit metric is below the lower bound, the new model can be discarded. If the goodness of fit metric is above the upper bound, the new model can be adopted. Otherwise, both models can be evaluated based on additional log records.

With reference back to FIG. 2, the model evaluation module 134 receives as input the candidate model 144. The model evaluation module 134 determines whether the candidate model 144 should be accepted as a new model. The model evaluation module 134 can make the determination based on information 147 entered by a user or can be made automatically based on rules specified in the template 146. If the candidate model 144 is accepted, then the new model is stored as an updated model 148 in the model datastore 136 for subsequent use. If the candidate model 144 is rejected, then the original model 141 will continue to be used.

In various embodiments, before a decision is reached, the model evaluation module 134 can provide the option of testing the candidate model 144 by deploying it to a development/test monitoring application (as opposed to the real production application) and having the application run with both the original model 141 and the candidate model 144 in parallel on the same transaction data used in real monitoring. This is done to maintain the current transaction monitoring process while also testing the "goodness of fit" of the candidate model 144 in real-time. After a set period and/or particular event occurrences, the test monitoring application can send a notification with information about the quality of both models 141, 144, and the decision-making entity can then make a final decision to accept/reject the candidate model 144 or to redeploy the candidate model 144 back to the test monitor to further measure its goodness of fit (e.g., such redeployment can happen over multiple iterations).

In various embodiments, a history of model changes can be stored and used at different levels. Fore example, in various embodiments, history indicating model discrepancies intentionally ignored in the past can be used to suppress future notifications on the same problem. In various embodiments, the history can be used to adjust decision thresholds in the template based on past decisions and/or the past measurements in the current decision-making process. For example, it may raise the acceptance threshold to prevent model fluctuation, or lower the threshold to reduce decision time.

Figure 4:
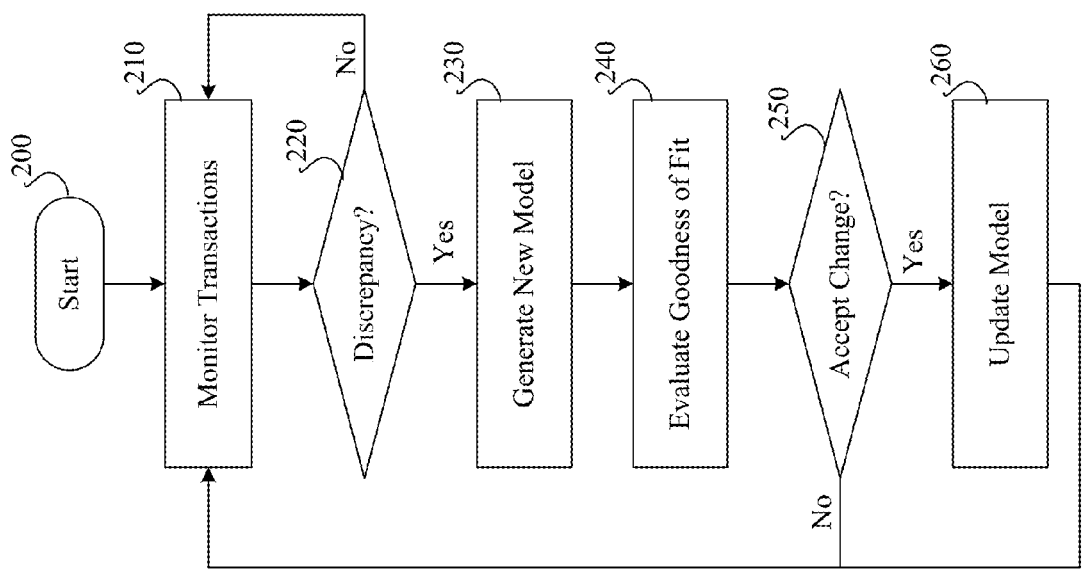
FIG. 4 is a flowchart illustrating a model evolution method in accordance with an exemplary embodiment.

Turning now to FIG. 4 and with continued reference to FIG. 2, a flowchart illustrates a model evolution method that can be performed by model evolution system of FIG. 2 in accordance with an exemplary embodiment. As can be appreciated in light of the disclosure, the order of operation within the method is not limited to the sequential performance as illustrated in FIG. 4, but may be performed in one or more varying orders as applicable and in accordance with the present disclosure. As can be appreciated, one or more steps can be added or deleted from the method without altering the spirit of the method.

In various embodiments, the method can run continually, for example, during operation of the computer 101 or be schedule to run based on time intervals or predetermined events.

In one example, the method may begin at block 200. The transactions are monitored based on the log data 140 and the system model 141 at block 210. If discrepancies exist between the model 141 and the log data 140 at 220, the method continues at block 230 with generating a candidate model 144 based on the model templates 146. Otherwise, the method continues with monitoring the transactions at 210.

Once the candidate model 144 has been generated at 230, the candidate model 144 is evaluated for a goodness of fit, based on the model templates 146 at 240. If the candidate model 144 passes a goodness of fitness test, it is determined whether the changes indicated by the candidate model 144 should be accepted at 250. If the changes should be accepted at 250, the original model 141 is updated with the changes and stored to the model datastore 136 at 260. Otherwise, the changes are ignored and the method continues with monitoring the transactions at 210.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a non-transitory storage medium comprising:
      a model generation module that generates a candidate model based on a discrepancy and a model template; and
      a model evaluation module that selectively updates a system model based on the candidate model.

2. The system of claim 1 further comprising a monitoring module that evaluates log data and that determines at least one discrepancy between the log data and the system model.

3. The system of claim 1 further comprising a templates datastore that stores a plurality of model templates, and wherein the model generation module selects the model template from templates datastore.

4. The system of claim 1 wherein the model template includes a set of rules for updating a model given the discrepancy and a computerized agent for executing the rules.

5. The system of claim 1 wherein the model template includes at least one of model generation implementation logic, goodness of fit measurement logic, confidence of goodness of fit measurement logic, and decision threshold definitions.

6. A computer program product for updating a model, the computer program product comprising:
   a non-transitory computer-readable storage medium that stores instructions for updating a model, the updating the model includes:
      evaluating log data;
      determining at least one discrepancy between the log data and a system model;
      generating a candidate model based on the discrepancy and a model template; and
      updating the system model based on the candidate model.

7. The computer program product of claim 6 further comprising evaluating the candidate model for a goodness of fit based on the model template.

8. The computer program product of claim 7 further comprising running the candidate model to determine the goodness of fit.

9. The computer program product of claim 6 wherein the model template includes a set of rules for updating a model given the discrepancy and a computerized agent for executing the rules.

10. The computer program product of claim 6 wherein the model template includes at least one of model generation implementation logic, goodness of fit measurement logic, confidence of goodness of fit measurement logic, and decision threshold definitions.

* * * * *